US006638557B2

(12) United States Patent
Qi et al.

(10) Patent No.: US 6,638,557 B2
(45) Date of Patent: Oct. 28, 2003

(54) DRY, EDIBLE OIL AND STARCH COMPOSITION

(75) Inventors: Helena Qi, Munster, IN (US); Mike Remmert, Romeoville, IL (US); Wen Shieh, Munster, IN (US); Allan Hedges, Crown Point, IN (US)

(73) Assignee: Cerestar Holding B.V. (NL)

( * ) Notice: Subject to any disclaimer, the term of this patent is extended or adjusted under 35 U.S.C. 154(b) by 0 days.

(21) Appl. No.: 09/929,208

(22) Filed: Aug. 14, 2001

(65) Prior Publication Data

US 2003/0044490 A1 Mar. 6, 2003

(51) Int. Cl.$^7$ ................................................. A23D 7/04
(52) U.S. Cl. ........................ 426/601; 426/602; 426/658
(58) Field of Search ............................ 426/98, 89, 96, 426/103, 658, 601, 603, 602

(56) References Cited

U.S. PATENT DOCUMENTS

| | | | | |
|---|---|---|---|---|
| 4,438,106 A | * | 3/1984 | Wagu et al. .................. 514/58 |
| 4,564,475 A | * | 1/1986 | Masaichiro ............ 252/400.21 |
| 4,777,162 A | * | 10/1988 | Hijiya et al. ................ 424/439 |
| 4,831,022 A | * | 5/1989 | Hijiya et al. ................ 424/439 |
| 4,911,942 A | * | 3/1990 | Yajima ........................ 426/455 |
| 5,189,149 A | * | 2/1993 | Bruzzese et al. ............. 514/54 |
| 5,472,954 A | * | 12/1995 | Loftsson ...................... 514/58 |
| 5,543,157 A | * | 8/1996 | Trinh et al. ............ 122/235.12 |
| 5,552,378 A | * | 9/1996 | Trinh et al. .................... 512/3 |
| 5,571,782 A | * | 11/1996 | Trinh et al. .................... 512/3 |
| 5,580,851 A | * | 12/1996 | Trinh et al. .................. 424/401 |
| 5,635,238 A | * | 6/1997 | Trinh et al. .................. 426/650 |
| 5,660,845 A | * | 8/1997 | Trinh et al. .................. 424/418 |
| 5,709,876 A | * | 1/1998 | Fuisz .......................... 424/439 |
| 5,780,089 A | * | 7/1998 | Lee .............................. 426/533 |
| 6,025,510 A | * | 2/2000 | Wimmer et al. ............. 426/417 |
| 6,048,577 A | * | 4/2000 | Garg .............................. 106/3 |
| 6,287,603 B1 | * | 9/2001 | Prasad et al. ................ 424/439 |
| 6,436,453 B1 | * | 8/2002 | van Lengerich et al. .... 426/103 |
| 6,444,253 B1 | * | 9/2002 | Conklin et al. ............. 426/534 |

FOREIGN PATENT DOCUMENTS

WO   WO 01/48024   *   7/2001

OTHER PUBLICATIONS

Qi, Z. H. 1999. Cereal Foods World vol. 44 (7) 460–465.*
Swern, ed. 1979. Baileys Industrial Oil and Fat Products, vol. 1, 4$^{th}$ edition. John Wiley & Sons, New York, p. 394–395.*

* cited by examiner

Primary Examiner—Carolyn Paden
(74) Attorney, Agent, or Firm—Muserlian, Lucas and Mercanti

(57) ABSTRACT

The dry composition has 50% w/w oil which contains polyunsaturated fatty acids such as omega-3 and/or omega-6 fatty acids, and 50% w/w of a starch based matrix. The starch based matrix has 70% by weight or more of a starch hydrolysate with a DE of 20–100 and a converted starch such as a thin boiled starch or a maltodextrin. The matrix can contain up to 15% of a cyclodextrin or lecithin. The composition is stable over time and is especially suited for use with food.

13 Claims, No Drawings

DRY, EDIBLE OIL AND STARCH COMPOSITION

BACKGROUND OF THE INVENTION

1. Field of the Invention

The present invention relates to a dry, edible oil and starch composition where the oil contains long chain polyunsaturated fatty acids, a method for making the dry composition and foodstuffs which contain the dry composition. The present invention is especially suitable for fish oils and other unsaturated oils and fatty acids.

2. Art Relating to the Invention

Studies have linked long chain polyunsaturated fatty acids (PUFA) and especially omega-3 and omega-6 fatty acids which are contained in fish oil with multiple medicinal and nutritional functions. These include prevention of coronary heart disease, suppression of platelet-aggregation, decreasing the level of serum cholesterol, treatment of cerebral thrombosis myocardial infraction, as well as others. Thus, there is a desire on the part of the food industry to supplement foodstuffs with PUFA. This is normally done by incorporating an oil high in PUFA into the foodstuff. Fish oil is a main source for these oils, however, plant and microbial liquids are also sources of oils which are high in PUFA.

There are obstacles to the use of fish oils and to employing PUFA in foodstuffs. First, PUFAs are very sensitive to heat, light, and oxygen. They degrade due to oxidation and result in a rancid composition. Fish oils themselves have an unpleasant odor and flavor and are a liquid which makes them unacceptable for a number of dry foodstuffs such as powdered drink mixes, infant formula, health bars, breakfast cereals, baked goods, dressings and dairy products.

To solve these problems, it has been suggested to complex the fish oil or the PUFA with cyclodextrin. See, for example, U.S. Pat. Nos. 4,438,106; 4,564,475; 4,775,749; 4,777,162; 4,831,022; 5,189,149; 6,025,510; and 6,048,557.

These references rely heavily on the inclusion phenomenon that occurs between a guest and the cyclodextrin host. Although cyclodextrins provide excellent protection for their guests, there are recognized drawbacks. For example, there is a limited load of guest substances in the natural one-to-one molecule-to-molecule mechanism associated with cyclodextrin complexation. Normally, there is a 10% to 25% w/w limitation to the amount of oil or its selected components that occur in the complexation product. Also, it is not uncommon to employ organic solvents during either complexation or washing. This introduces a contaminate which must be removed or minimized. Furthermore, because cyclodextrins have a finite cavity size, certain guests bind better than others. Selective binding can occur when not enough cyclodextrin cavities are present for all the molecules of a multi-component guest substance. Finally, the percent of cyclodextrin in PUFA complexes is often as high as 70% or more, thereby leaving a product with only 30% w/w or less of guest.

Our copending U.S. patent application Ser. No. 09/686, 695 now U.S. 2003/0044490 employs a unique encapsulating mix which can increase the guest load to 40% w/w, however, the encapsulating mix still relies heavily on cyclodextrin.

SUMMARY OF THE INVENTION

It has now been discovered that a dry composition which contains a high load of an oil high in polyunsaturated fatty acid can be made by employing a multi-component starch based matrix which contains little or no cyclodextrin. The matrix comprises a starch hydrolysate, a converted starch and little or no cyclodextrin and/or lecithin. The dry composition of the present invention avoids a number of the problems of the prior art.

First, the present invention has been found to achieve oil loads of about 50% w/w based on the composition. This allows for a high load of oil per unit weight and a corresponding high load of polyunsaturated fatty acids.

Also, there is no need for special organic solvents or for precipitation or isolation of the complex from the aqueous solution. The aqueous solution can be dried directly. This provides for a cost savings by decreasing the number of steps necessary for making the dry composition as well as the lack of the organic solvents.

With little or no cyclodextrin used in the composition, encapsulation occurs without a concern for the molecular size of the guest.

One of the unique aspects of the present invention is that the dry composition of oil and starch based matrix is exceptionally stable and the amount of oil in the dry compoosition is greater than the amount of oil in dry products made from cyclodextrin alone or conventional emulsifying starches.

The present invention has also been found to have long term stability in a dry state. This is important for storage purposes.

Finally, by employing conventional starches in the matrix, overall cost is reduced.

Broadly, the present invention entails a dry, stable, edible oil composition comprising:
(a) about 35 to about 55% by weight composition of an oil which contains a polyunsaturated fatty acid; and
(b) about 65 to about 45% by weight composition of a multi-component encapsulating matrix, said matrix comprising:
  (1) about 65 to about 35% by weight matrix of a starch hydrolysate having a dextrose equivalent of about 20 to about 100;
  (2) about 35 to about 65% by weight matrix of a converted starch selected from the group consisting of a maltodextrin, a thin boiled starch or a combination of maltodextrin and thin boiled starch; and
  (3) about 0 to about 15% by weight matrix of a cyclodextrin; and
  (4) about 0 to about 15% by weight matrix of a lecithin.

The method for making the dry, stable, edible oil composition of the present invention comprises:
(a) forming an aqueous slurry of a multi-component encapsulating matrix having a solids content of about 40 to about 70% by weight, wherein said multi-component encapsulating matrix comprises:
  (1) about 65 to about 35% by weight matrix of a starch hydrolysate having a dextrose equivalent of about 20 to about 100;
  (2) about 35 to about 65% by weight matrix of a converted starch selected from the group consisting of a maltodextrin, a thin boiled starch or a combination of maltodextrin and thin boiled starch; and
  (3) about 0 to about 15% by weight matrix of a cyclodextrin; and
  (4) about 0 to about 15% by weight matrix of a lecithin;
(b) adding about 35 to about 55% by weight dry composition, an oil which contains a polyunsaturated fatty acid to said slurry;

(c) mixing said slurry and oil to form an oil-in-water emulsion;

(d) drying said emulsion to obtain a dry, stable, edible oil composition comprising said oil and said matrix.

Foodstuffs which employ the dry, stable, edible oil composition of the present invention include gelatin and pudding, sauce mixes, dietary supplements, candy, jelly, powdered beverage mixes, meats, infant formula, baked goods, dairy products, breakfast cereals, health bars, and the like.

In order to formulate a foodstuff with the dry, stable, edible oil composition of the present invention, the foodstuff is made in a conventional manner except that the dry, edible oil composition of the present invention is added during formulation.

DETAILED DESCRIPTION OF THE PRESENT INVENTION

The dry, stable edible oil composition comprises an edible oil and a multi-component encapsulating starch base matrix.

Sources of the oil which contain polyunsaturated fatty acids and can be employed in the present invention include fish oil, plant oil, microbial oil and animal fats and oils which contain one or more polyunsaturated fatty acids. Plant or vegetable oils include black current oil, wheat germ oil, borage oil, flax seed, evening primrose oil, linseed oil, sunflower oil, nut oil and olive oil. Fish oils for use in the present invention include oils from mackerel, trout, herring, tuna, salmon, cod, menhaden and sardines. Other animal sources include egg yolks. Microbial sources include fungus such as fungus from the order of Mucorales or genus Mortierella. Algal sources can also be used in the present invention.

The polyunsaturated fatty acids (PUFA) which are contained within these oils and which are employed in the present invention include C18, C20 and C22, omega-3 polyunsaturated fatty acids and C18, C20 and C22, omega-6 polyunsaturated fatty acids. Such PUFAs include docosahexaenoic acid (DHA), eicosapentaenoic acid (EPA), gammalinolenic acid (GLA), arachiodonic acid (ARA), oleic acid, linoleic acid, and linolenic acid.

The amount of PUFA which are contained in these oils varies from oil to oil. Fish oil generally contains about 30% w/w (by weight based on the total weight of the oil).

The amount of oil in the dry, stable, edible oil composition of the present invention is about 35% to about 55% by weight of composition and, more preferably, about 50% by weight composition.

The other component of the dry, stable, edible oil composition is a multi-component, encapsulating starch base matrix which comprises a starch hydrolysate, a converted starch, and little or no cyclodextrin and/or lecithin.

The amount of starch base matrix in the dry, stable, edible oil composition of the present invention is about 45% to about 65% by weight of composition and, more preferably, about 50% by weight composition. The oil and matrix suitably add to 100% of the weight of the composition.

The starch hydrolysate employed in the present invention has a dextrose equivalent (DE) of about 20 to about 100 and, more preferably, about 30 to about 60. Good results have been obtained with a starch hydrolysate having a DE of about 30 to about 40.

Dextrose equivalent, DE, is a conventional term used to describe the degree of conversion of starch to a starch hydrolysate. There are a number of methods for determining DE. For purposes of this specification and claims, the DE is determined by Lane-Eynon Procedure (E26 Standard Analytical Method, revised Jul. 9, 1993 CRA Manual).

The starch hydrolysate used in the present invention is any conventional starch hydrolysate made by acid or enzyme hydrolysis of starch. Any source of starch can be employed such as corn, wheat or rice, and any variety of starch, waxy, common or high amylose.

Good results have been obtained with corn starch and, specifically, with a corn syrup solids having a DE of about 36. Corn syrup (liquid) and corn syrup solids (solid) is the term used for hydrolysates of starch having a DE of 20 to 100.

The amount of starch hydrolysate used in the matrix is suitably about 65% to about 35% by weight of the dry matrix (w/w) and, more preferably, about 40% to about 60% w/w. Good results have been obtained at about 45% to about 50% w/w.

The converted starch is selected from the group of thin boiled starch, maltodextrins or a combination of the two.

A thin boiled starch suitable for use in the present invention has a fluidity of about 65 ml to about 90 ml and, more preferably, about 70 ml to about 80 ml. The fluidity of the starch is suitably measured in accordance with the following procedure.

Add 200 ml of distilled water into a sample of thin boiled starch in a 500 ml alumunum cup. The size of the sample of starch varies with the moisture content of the starch. For example, 5% moisture uses 74 mg of starch, 10% moisture uses 80 mg of starch, and 15% moisture uses 87 mg of starch. Next, the mix is placed in a 190° F. (88° C.) steam bath and stirred continuously until the mixture reaches 190° F. (88° C.). Then, the sample is removed from the steam bath and stirring is continued until the total cook time is 2.5 minutes. Next, the slurry is cooled to 75° F. (24° C.) in a 50° F. (10° C.) water bath while continuing to stir the sample.

Once the sample is prepared, it is poured through a funnel to measure its fluidity. The funnel has been kept at 75° F. (24° C.) The funnel is a 100 mm diameter pyrex 60° angle funnel which has a stem (I.D. 0.8 cm) measuring 9 cm from the vertex of the funnel and fitted with a stainless steel tip (0.8 inch opening). The funnel is filled to a level of 1.3 cm below the rim of the funnel and the sample is allowed to flow through the funnel and the stem for exactly one minute, keeping the level of the sample in the funnel constant. The sample is collected in a graduated cylinder and the volume was read and reported as fluidity (in mls). Prior to collecting the sample, the sample is allowed to flow through the funnel and the stem for 20 seconds to condition the funnel stem and tip.

To assure proper fluidity results, the funnel and tip must dispense 255–260 mls/minute of laboratory grade water (75° F.) following the above procedure.

Any source of starch can be used to make a suitable thin boiled starch for the present invention, for example, corn, wheat or rice. Also, any variety of starch can be used, common, waxy, high amylose. Good results have been obtained with corn starch.

Thin boiled starch is typically a starch which has been treated with a mineral acid in an aqueous slurry wherein the acid is allowed to act on the starch for 1 to 100 hours at a temperature of 30° C. to 50° C. with constant agitation. This reaction is done below the gelatinization temperature of the starch, thus, the granules are intact and the starch product has a slightly lower viscosity compared to the non-thin boiled starch. A suitable thin boiled starch can also be made using enzyme in a conventional manner.

A maltodextrin suitable for use in the present invention has a DE of about 1 to about 19 and, more preferably, about 5 to about 15. Good results have been obtained with a maltodextrin having a DE of about 15.

Maltodextrins are made by the action of enzymes or acids to hydrolyze an aqueous slurry of gelatinized starch and to degrade the starch. No starch granule is present in the maltodextrin.

Any source of starch can be used to make a suitable maltodextrin for use in the present invention, for example, corn, wheat or rice. Also, any variety of starch can be used, common, waxy or high amylose. Good results have been obtained with a maltodextrin from corn starch having a DE of 15.

The amount of converted starch employed in the matrix is suitably about 65% to about 35% w/w (by weight matrix), and, more preferably, about 40% to about 60% w/w. Good results have been obtained at about 40% to about 50% and, more specifically, at about 40%, about 45% and about 50% w/w.

Either one or both of the converted starches can be employed. Good results have been obtained employing either the maltodextrin or the thin boiled starch.

Preferably, the combined weight of the starch hydrolysate and the converted starch in the matrix is about 70% w/w or more and, more preferably, about 80% w/w or more. The matrix can contain about 100% starch hydrolysate and converted starch.

The matrix can also contain a small amount of a cyclodextrin and/or lecithin, about 30% w/w or less and, more preferably, about 20% w/w or less.

Cyclodextrins are a torus shaped molecule made from starch by the action of an enzyme, cyclodextrin glycosyltransferase (CGT) on a low DE, 1–5, starch hydrolysate or maltodextrin in aqueous slurry. Alpha, beta or gamma cyclodextrins, are readily available.

Any conventional source of cyclodextrin can be used in the present invention. Preferably, either a beta or a gamma cyclodextrin is used in the present invention. Derivatives of cyclodextrin can also be used.

The amount of cyclodextrin employed in the present invention is about 0% to about 15% by weight matrix (w/w). More preferably, about 5 to about 10% w/w.

Lecithin is a phosphatidyl choline. Any conventional source of lecithin can be employed in the present invention such as egg yolk lecithin or soybean lecithin. Good results have been obtained with soybean lecithin.

The amount of lecithin in the matrix is suitably about 0% to about 15% w/w, by weight matrix. More preferably, about 5% to about 10% w/w.

In order to make the composition of the present invention, first an aqueous slurry comprising the matrix is formed. In order to form the aqueous slurry, the various components of the matrix are added to water and then agitated or mixed to form an homogeneous mixture in water. Conventional equipment is used in a conventional manner in order to form the slurry, for example, a tank equipped with an impeller.

The individual components of the matrix are added to the water in an amount based on the amount of each individual component in the final dry composition. The amount of water employed is enough to provide a slurry with a solids content of about 30% to about 70% by weight slurry. Preferably, the slurry has a solids content of about 50% to about 60% by weight solids.

Next, the oil is added to the aqueous slurry. This is done in a conventional manner using conventional equipment. The amount of oil added to the slurry is based on the amount of oil intended for the final, dry composition.

After the oil has been added to the slurry, the slurry is mixed with sufficient energy and for a sufficient period of time to form an oil-in-water emulsion. Oil droplets are encapsulated by the matrix. Such an emulsion has been found to be very stable. Forming the emulsion is done in a conventional manner using conventional equipment such as a tank with an impeller or with in-line mixing apparatus in a continuous process.

The formation of the slurry and the emulsion are suitably accomplished at atmospheric temperature and pressure. Since the formulation is conducted at mild conditions, there is no loss of components. Thus, the components added to the slurry are carried through to the dry products with nominal loss.

Finally, the emulsion is dried. The drying is conducted in a conventional manner using conventional equipment. Suitably, the emulsion is spray dried or freeze dried in a conventional manner to obtain a dry product having a moisture content of about 2% to about 10% and, more preferably, about 5%.

The dry composition is suitably incorporated into a foodstuff so as to deliver the oil and, more particularly, the PUFA to the consumer by means of the foodstuff. Suitable foodstuffs include gelatin, pudding, sauce dry mixes, dry mixes for salad dressing, candy, jellies, jams, powdered beverage mixes, meats, infant formula, breakfast cereals, dairy products, baked goods, health bars, and the like. It can also be provided to the consumer through nutritional supplements, vitamin tablets, tablets in general, and to animals in animal feed and food supplements.

The dry composition of the present invention is added to and formulated with the foodstuffs in a conventional manner using conventional equipment. For example, the dry composition of the present invention is combined with the other components of the foodstuff during formulation. The amount of dry composition added to the foodstuff is dependent upon the amount of oil that is intended to be present in the resulting foodstuff.

These and other aspects of the present invention may be more fully understood by reference to one or more of the following examples.

EXAMPLE 1

This example illustrates making a dry composition in accordance with the present invention.

Into a tank of water containing about 0.1 liters of water at a temperature of 25° C. to 40° C., a thin boiled starch, corn syrup solids (starch hydrolysate 36 DE) and beta cyclodextrin were added in a weight ratio of 45:45:10 and subsequently mixed to form a slurry. Mixing was conducted for ½ to 18 hours to form the slurry.

Next, fish oil was added to the slurry in an amount equal to the weight of the starch components, i.e. beta cyclodextrin, thin boiled starch and corn syrup solids.

The combined mixture was then emulsified with a hand held homogenizer and sequentially freeze dried.

Product analysis performed by Standard AOAC official methods, Ba 3–38 ("oil") and Ce 16–89 ("fatty acid composition by GLC") were used to determine the amount of oil in the dry composition. It was found that the amount of oil in the dry composition was 49.7% based on the weight of the dry composition.

In order to determine the actual amount of fatty acids in the product, the amount of fatty acids in the oil is determined. The fish oil used in the example had 28% fatty acids, thus, the amount of fatty acids in the final dry composition, based on the weight of the dry composition, is 13.9% (28% of 49.7%).

EXAMPLE 2

In order to make additional dry composition in accordance with the present invention and to compare the present invention against other starch based compositions to illustrate the high load of oil in the dry composition of the present invention, further dry compositions were made. The starch components in each dry product are listed below in Table 1. Product A is the product made in Example 1.

Each of the compositions listed in Table 1 were made into an aqueous slurry in accordance with Example 1 by employing 0.1 liters of water.

TABLE 1

Percent by Weight/Matrix

| Prod. | CSS | TB | MD | BCD | GCD | L | OSAN |
|---|---|---|---|---|---|---|---|
| A(PI) | 45 | 45 | — | 10 | — | — | — |
| B(PI) | 50 | 50 | — | — | — | — | — |
| C | 17 | — | — | 66 | — | — | 17 |
| D | 17 | — | — | 66 | — | — | 17 |
| E | 25 | — | — | 50 | — | — | 25 |
| F | 33 | — | — | 33 | — | — | 33 |
| G(PI) | 45 | — | 45 | 10 | — | — | — |
| H(PI) | 45 | 45 | — | — | 10 | — | — |
| I | — | — | — | — | 100 | — | — |
| J | — | — | — | 100 | — | — | — |
| K | 50 | — | — | — | — | — | 50 |
| L(PI) | 50 | — | 50 | — | — | — | — |
| M(PI) | 40 | 40 | — | 10 | — | 10 | — |
| N | 25 | — | — | 50 | — | — | 25 |

The abbreviations used in table above are as follows:
PI=matrix made in accordance with the present invention
BCD=beta cyclodextrin
GCD=gamma cyclodextrin
CSS=corn syrup solid, a starch hydrolysate of 36 DE
TB=C*Plus 06036 from Cerestar USA, a thin-boiled starch
OSAN =C*EmCap Instant 12633 from Cerestar USA, an n-octenyl succinate of starch(emulsifying starch)
MD=C*Dry MD 01918 from Cerestar USA, a starch hydrolysate of 15 DE
L=a soybean lecithin To each of these aqueous slurries, fish oil was added as listed in Table 2 below. The amounts in Table 2 are reported based on the total weight of the dry composition.

TABLE 2

| Product | Oil (%) Formulate | Oil (%) Actual | omega-3 FA in Oil | omega-3 FA Actual |
|---|---|---|---|---|
| A(PI) | 50 | 49.7 | 28 | 13.9 |
| B(PI) | 52 | 52 | 28.1 | 14.6 |
| C | 40 | 42.6 | 27.5 | 11.7 |
| D | 50 | 48.5 | 27.7 | 13.4 |
| E | 50 | 49 | 27.8 | 13.6 |
| F | 50 | 48.3 | 27.9 | 13.5 |
| G(PI) | 50 | 48.7 | 28.1 | 13.7 |
| H(PI) | 50 | 48.2 | 27.8 | 13.4 |

TABLE 2-continued

| Product | Oil (%) Formulate | Oil (%) Actual | omega-3 FA in Oil | omega-3 FA Actual |
|---|---|---|---|---|
| I | 40 | 31.1 | 25.0 | 7.8 |
| J | 40 | 37.7 | 27.1 | 10.2 |
| K | 40 | 30.1 | 27.9 | 8.4 |
| L(PI) | 51 | 50.2 | 27.2 | 13.7 |
| M(PI) | 52 | 51.7 | 27.5 | 14.2 |
| N | 50 | 40.9 | 27.8 | 11.4 |

Oil = OmegaPure ® fish oil from Omega Protein, Inc.

The emulsions were made in accordance with Example 1 for Products B–L and then dried in accordance with Example 1. As noted above, Product A was the product of Example 1.

In order to make product M, 10 grams of lechithin was added to 120 milliliters of water (55° C.) and sonicated for 15 minutes. In a separate container, 10 grams of BCD, 40 grams of TB and 40 grams of CSS were mixed with 120 milliliters of water (20° C). The two liquid mixtures were combined with 104 grams of fish oil and subject to vigorous shaking (250 rpm) at room temperature (20° C.) for two (2) hours. The resulting paste was emulsified with a homogenizer and then freeze dried to yield 180 grams of yellow powder.

In order to make Product N, the starch components listed in Table 1 above were mixed with water to form a slurry having about 60% by weight solids content. The fish oil was added to this slurry and the mixture was subsequently homogenized in a conventional manner to form an emulsion. This emulsion was subsequently spray dried in a conventional manner with an inlet temperature of 330° C. and an outlet temperature of 150° C.

From the results reported in Tables 1 and 2 above, a number of conclusions can be drawn.

The present invention allows for higher oil loads than cyclodextrin alone, compare Products I and J with product of the present invention.

The starch matrix of the present invention performed beter than conventional encapsulating starches, compare K and N to product of the present invention.

The present invention without the use of cyclodextrins works as well with as with cyclodextrin or lecithin, compare Products A to B, G to H, and L to M.

EXAMPLE 3

This example illustrates the higher loads of fish oil of the present invention compared to conventional, commercial products.

Table 3 below lists the loads of the commercial product measured in the same way as the products reported in Table 2 above.

TABLE 3

| Product | Oil (%) Formulate | Oil (%) Actual | Omega-3 FA in Oil | Omega-3 FA Actual |
|---|---|---|---|---|
| Control#1 | Unknown | 22.1 | 27.2 | 6.0 |
| Control#2 | Unknown | 19.0 | 31.5 | 6.0 |
| Control#3 | Unknown | 12.9 | 82.5 | 10.6 |

Control#1 = a commercial powdered fish oil from BASF (DRY-N-3 ® 14:8C oil)
Control#2 = a commercial powdered fish oil from WACKER (OMEGADRY ® 1510)
Control#3 = a commercial powdered fish oil from WACKER (OMEGADRY ® 2050)

As can be seen, Products A, B, G, H, L or M (PI) had a higher load of fish oil than the commercial product.

EXAMPLE 4

This example illustrates the long term stability of the present invention.

Table 4 illustrates the long term stability of Product A, Example 1.

TABLE 4

|  | Fish Oil Load (% w/w) |
| --- | --- |
| Before incubation | 49.7 |
| After 6 weeks incubation | 49.3 |
| Percent Retention = 96% | |

To evaluate the stability of the product, an accelerated shelf life study was carried out. A sample (10 grams) of selected product was placed in a tightly capped polyethylene jar and kept at 45±0.1° C. for a specified period of time (6 weeks). Levels of FA in each sample before and after incubation at 45° C. were measured and compared.

To calculate the retention, the amount of fatty acid in the oil was determined at the beginning, as shown in Table 2, and these measurements were again determined after incubation. It is noted that the percent of fatty acids in the oil decreased over time.

EXAMPLE 5

This example illustrates the long term stability of the present invention compared to other products.

TABLE 5

| Product | 2-week Incubation | 6-week Incubation |
| --- | --- | --- |
| A (PI) | N/A | 96.0 |
| B (PI) | 97.4 | 94.8 |
| H (PI) | N/A | 99.1 |
| M (PI) | 97.8 | N/A |
| Control #1 | 92.9 | 81.7 |
| Control #2 | N/A | 73.4 |
| Control #3 | N/A | 7.0 |

N/A = not available

These tests and results were conducted in accordance with Example 4 above.

As can be seen, the present invention out-performed the commercial product.

EXAMPLE 6

This example illustrates formulating a muffin in accordance with the present invention.

A muffin was made employing the following ingredients.

TABLE 6

| Dry Ingredients | Percentage |
| --- | --- |
| All purpose flour[1] | 70.9 |
| Product B | 7.2 |
| Sugar | 10.8 |
| Nonfat dry milk | 2.7 |
| C*PolarTex-Instant 12640[2] | 3.2 |
| Sodium aluminum phosphate | 1.9 |
| Salt | 1.7 |
| Baking soda | 1.6 |

[1]Pillsbury
[2]Instant starch from Cerestar USA, Inc., Hammond, Indiana

Product B from Example 2 above was employed in this example.

In order to make the muffin, the dry components were first sifted together into a bowl and mixed together. Then 1.2 oz. of vegetable oil was mixed into the dry components followed by 1 egg and 1¼ cup milk. Once the dough was well moist, it was placed in greased muffin tins and baked at 400° F. (204° C.) for 20–25 minutes. This made 12 omega-3 fatty acid enriched (300 mg. each) muffins.

A taste panel found them to be excellent in flavor without any "fishy" flavor or odor. The taste panel also found them to be the same in flavor and texture as the muffins made without Product B.

EXAMPLE 7

This example illustrates making a granola bar in accordance with the present invention.

The following ingredients are combined and pressed into granola bars.

TABLE 7

| Ingredients | Percentage |
| --- | --- |
| Granola (18% sugar) | 34 |
| Crisp Rice | 13 |
| Almonds | 3.5 |
| Coconuts (medium) | 5.0 |
| Dextrose | 5.0 |
| Fructose | 8.0 |
| Brown sugar | 1.0 |
| Salt | 0.3 |
| Vanilla extract | 0.2 |
| Glycerine | 2.0 |
| Shortening | 6.0 |
| Real chocolate chips (4000 ct.) | 9.0 |
| Sucrose | 11 |
| Product B | 2 |

In this way, a granola bar in accordance with the present invention is made.

What is claimed is:

1. A dry, stable, edible oil composition comprising:
   (a) about 35% to about 55% by weight composition of an oil which contains a polyunsaturated fatty acid; and
   (b) about 65% to about 45% by weight composition of a multi-component encapsulating matrix, said matrix comprising:
      (1) about 65% to about 35% by weight matrix of a starch hydrolysate having a dextrin equivalent of about 20 to about 100;
      (2) about 35% to about 65% by weight matrix of a converted starch selected from the group consisting of a maltodextrin, a thin boiled starch or a combination of maltodextrin and thin boiled starch;
      (3) about 0% to about 15% by weight matrix of a cyclodextrin; and
      (4) about 0% to about 15% by weight matrix of a lecithin; and (c) wherein said composition is made by
mixing an aqueous slurry of said matrix and said oil to form an oil-in-water emulsion, and
drying said emulsion to obtain said dry, stable, edible oil composition.

2. The composition of claim 1 wherein said starch hydrolysate is obtained from corn starch and has a dextrose equivalent of about 30 to about 40.

3. The composition of claim 1 wherein said matrix comprises about 50% by weight starch hydrolysate, and about 50% by weight converted starch.

4. A foodstuff comprising an edible food product and a dry, stable, edible oil according to claim 1.

5. The foodstuff of claim 4 wherein said edible food product is selected from the group consisting of candy, jelly, a beverage, a meat, a dairy product, gelatin mix, pudding mix, sauce and gravy mixes, salad dressing mixes, or a bakery product.

6. A method for making a dry, stable, edible oil composition comprising:
(a) forming an aqueous slurry of a multi-component encapsulating matrix having a solids content of about 40% to about 70% by weight wherein said multi-component encapsulating matrix comprises
(1) about 65% to about 35% by weight matrix of a starch hydrolysate having a dextrin equivalent of about 20 to about 100;
(2) about 35% to about 65% by weight matrix of a converted starch selected from the group consisting of a maltodextrin, a thin boiled starch or a combination of maltodextrin and thin boiled starch; and
(3) about 0% to about 15% by weight matrix of a cyclodextrin; and
(4) about 0% to about 15% by weight matrix of a lecithin;
(b) adding about 35% to about 55% by weight dry composition, an oil which contains a polyunsaturated fatty acid to said slurry;
(c) mixing said slurry and oil to form an oil-in-water emulsion; and
(d) drying said emulsion to obtain a dry, stable, edible oil composition comprising said oil and said matrix.

7. The method, of claim 6 wherein said slurry has a solid content of about 30% to about 60% by weight.

8. The method of claim 6 wherein said drying is freeze drying.

9. The method of claim 6 wherein said drying is spray drying.

10. A dry, stable, edible oil composition comprising:
(a) about 50% by weight composition of an oil which contains a polyunsaturated fatty acid; and
(b) about 50% by weight composition of a multi-component encapsulating matrix, said matrix comprising:
(1) about 65% to about 35% by weight matrix of a starch hydrolysate having a dextrin equivalent of about 20 to about 100;
(2) about 35% to about 65% by weight matrix of a converted starch selected from the group consisting of a maltodextrin, a thin boiled starch or a combination of a maltodextrin and thin boiled starch; and
(3) about 0% to about 15% by weight matrix of a cyclodextrin; and
(4) about 0% to about 15% by weight matrix of a lecithin.

11. The composition of claim 10 wherein the matrix comprises about 10% by weight cyclodextrin, about 45% by weight converted starch and about 45% by weight starch hydrolysate.

12. The composition of claim 10 wherein the matrix comprises about 10% by weight cyclodextrin, about 10% by weight lecithin, about 40% by weight starch hydrolysate and about 40% by weight converted starch.

13. The composition of claim 10 wherein said cyclodextrin is either a beta cyclodextrin or a gamma cyclodextrin.

* * * * *